Nov. 3, 1970 W. H. CUTTINO ET AL 3,538,381
OVERLOAD PROTECTION REPLICA RELAY DEVICE
Filed Sept. 25, 1967 2 Sheets-Sheet 1
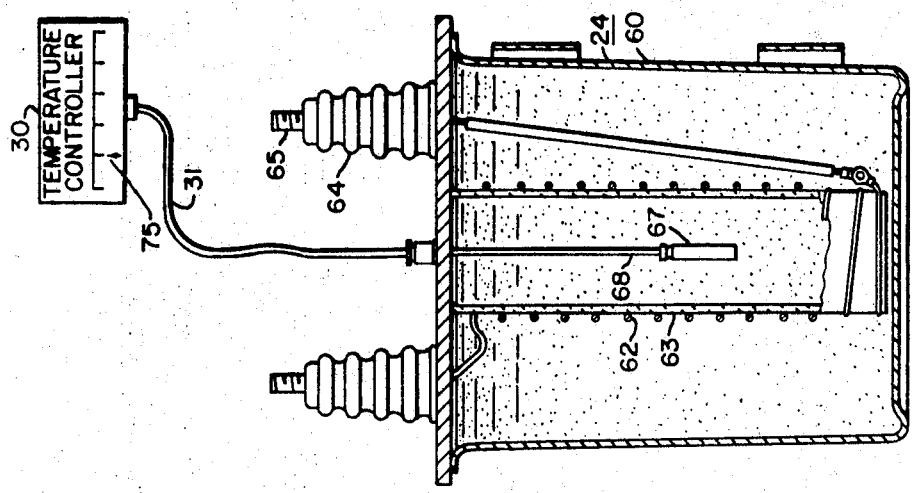
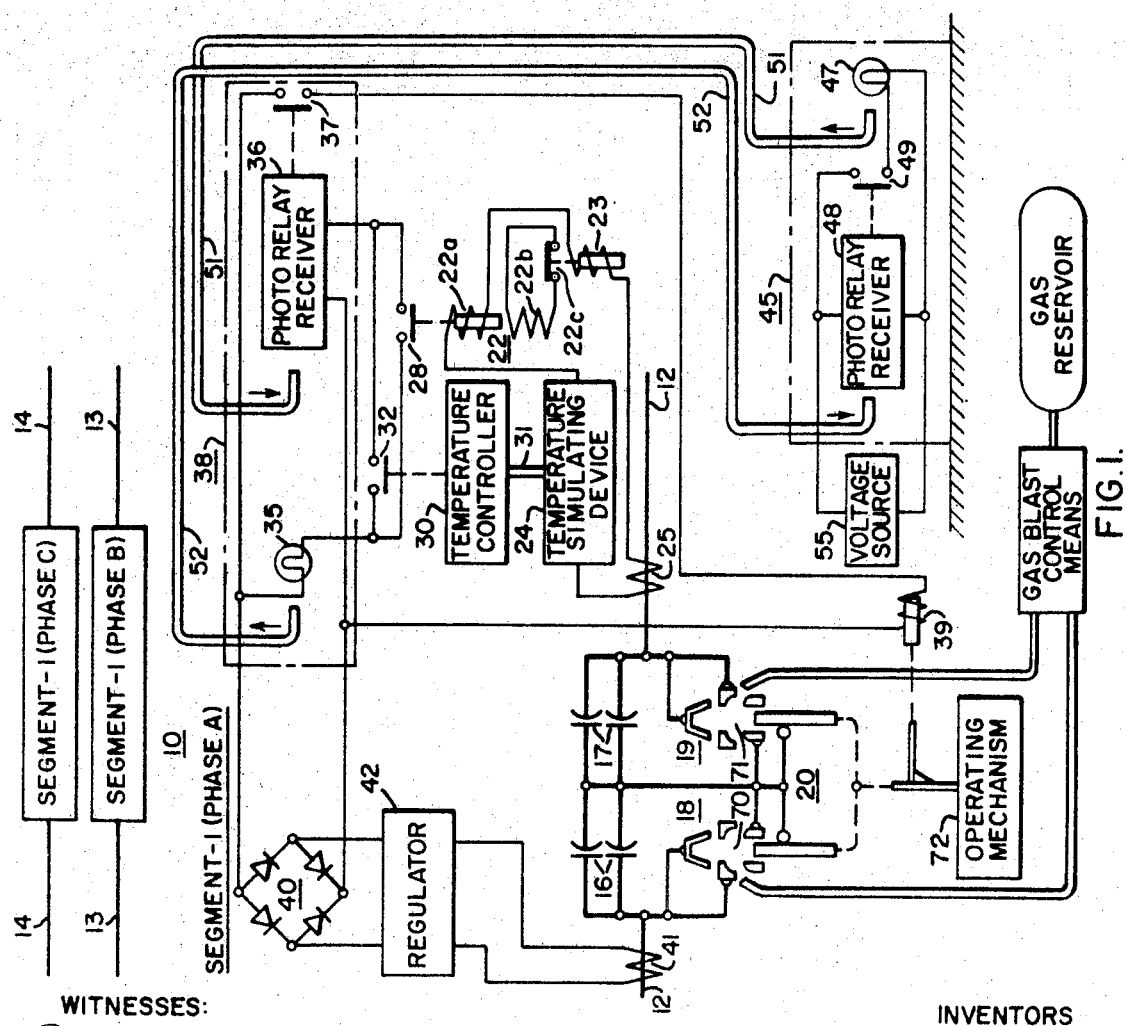
WITNESSES:
Bernard R. Giegney
E. Strickland
INVENTORS
William H. Cuttino and
James N. Santilli.
BY G. T. Stratton
ATTORNEY

United States Patent Office 3,538,381
Patented Nov. 3, 1970

3,538,381
OVERLOAD PROTECTION REPLICA RELAY DEVICE
William H. Cuttino and James N. Santilli, Bloomington, Ind., assignors to Westinghouse Electric Corporation, Pittsburgh, Pa., a corporation of Pennsylvania
Filed Sept. 25, 1967, Ser. No. 670,085
Int. Cl. H02h 1/04, 5/06, 7/16
U.S. Cl. 317—12                5 Claims

ABSTRACT OF THE DISCLOSURE

A protective system for series capacitor installations including overvoltage and overcurrent protection for the capacitors. The overcurrent protection includes instantaneous and inverse time delay relays for effecting closure of a bypass switch in response to relatively high overcurrents and a replica relay for effecting closure of the bypass switch in response to lower overcurrents which can be permitted for longer periods of time. The replica relay consists of a temperature simulating device having a thermal and radiating characteristics equivalent to those of the capacitor to reproduce the capacitor temperature, with a heater for heating the simulating device from the line current and a temperature sensor in the simulating device to control the bypass switch.

BACKGROUND OF THE INVENTION

The present invention relates to an arrangement which functions to protect an electrical component or components from short time overloads as well as excessive thermal overloads due to longer overcurrent conditions. The arrangement has particular utility in series capacitor installations in which capacitor units are employed to compensate for series inductive reactance in transmission and distribution lines. Such capacitor units allow an increase in the power transmission limit of the line or permit the controlled division of power between parallel operating lines.

In certain long distance transmission systems in which series capacitors are employer in two parallel, three phase lines, the capacitors are normally expected to operate up to 75% of their continuous current rating. If one of the parallel lines is removed because of a system fault, the current in the other line will double, and the system is expected to encounter a swing current which approaches three times the continuous current rating of the series capacitor and which decreases to one and a half (1½) times the rating within a few seconds. The current is expected to drop from this value to one and a quarter (1¼) times the capacitor rating within 30 minutes, and within the next 30 minutes it is expected to drop to the continuous current rating of the capacitor. Thus, the change to one line (from the two parallel lines) causes a current or load profile substantially as described above.

To meet current profiles of this type resulting from system faults and the consequent changeover, the series capacitors should be provided with protective spark gaps to limit the voltage applied to the capacitors during the time of the fault. Further means should be provided for protecting the capacitors from short term overloads just under the gap sparkover setting. The protective means should also take advantage of the increased time-current capability of the capacitor when operating in lower temperature environments.

BRIEF SUMMARY OF THE INVENTION

The present invention discloses a simple and inexpensive means for protecting series capacitors from short time overloads as well as excessive thermal overloads resulting from longer time duration fault current conditions. The means include an instantaneous and delay type current measuring relay for providing the short time protection, and a current-time-temperature measuring device for simulating the temperature condition of the capacitors. The instantaneous and delay current measuring relay may be of the types shown and described in Westinghouse Instruction Publications IL41–771C and IL41–101L dated December 1964 and October 1965, respectively, though the invention is not limited thereto.

The current-time-temperature measuring device comprises a container, having a prescribed heat radiating surface, enclosing a resistor surrounded by silica sand and oil. The container is located outside in the open air and the resistor is adapted to be energized by a current corresponding to the current flowing through the series capacitor unit. In operation, the resistor radiates watts of energy per square inch of exposed container surface in amounts similar to those of a typical capacitor unit. The temperature inside of the container is measured by a remotely located measuring unit and a heat sensing means embedded in the sand and oil in the container, the sensing means suitably connected to the remote measuring unit. The measuring unit is provided with a means for selecting the temperature at which the unit operates to initiate the closing of a capacitor bypass switch when the selected temperature is exceeded. Details of appropriate bypass switches are shown and described in copending application Ser. No. 390,288 filed by R. E. Marbury on Aug. 18, 1964, now pat. 3,385,941, issued May 28, 1968, and in U.S. Pat. 3,335,362 issued Aug. 8, 1967 to W. H. Cuttino, both application and patent assigned to the present assignee.

THE DRAWINGS

The objects and advantages of the invention will be best understood by referring to the following detailed description in connection with the accompanying drawings in which:

FIG. 1 is a schematic circuit diagram of one phase of a series capacitor installation having a protective arrangement constructed in accordance with the principles of the invention;

FIG. 3 is a diagrammatic representation of a replica relay device constructed in accordance with the inventive principles.

PREFERRED EMBODIMENT

Figure 2:
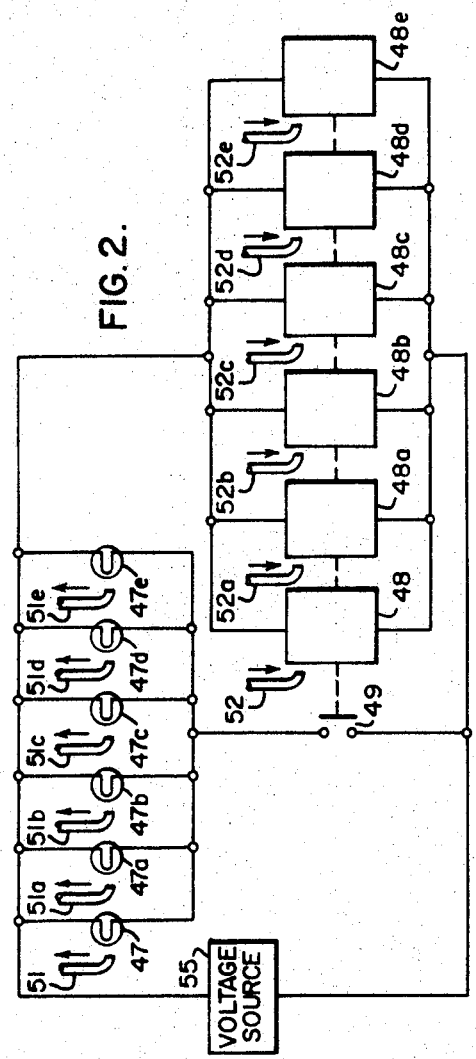
FIG. 2 is a circuit diagram of an interphase switching arrangement, a portion of which is depicted in FIG. 1.

Specifically, there is representatively shown in FIG. 1 one segment of a capacitor installation 10 for a three phase power transmission system. The segment is connected serially in phase lines 12, 13 and 14 of a high voltage line, and is further designated phases A, B and C for purposes of illustration. Each phase is provided with the circuit arrangement (presently to be described) shown connected in phase line 12 in FIG. 1. Additional capacitive segments can be provided in the phase lines as well as in a parallel three phase line (not shown), and each phase of each segment could have the circuit arrangement and devices shown in FIGS. 1 and 3. However, on balanced three phase systems, the overloads may be measured in only one phase thus requiring only the overload protecting arrangement presently to be described.

The portion of the segment for each phase line includes a plurality of capacitors 16 and 17 serially connected in the phase line, phase line 12 being the one chosen for illustration in FIG. 1.

The term "capacitor" refers to a single capacitor unit or to a plurality of capacitor units connected together in subcombination. The term "capacitor bank" is used to denote all or a large fraction of all of the capacitor units in a given installation.

Across the capacitors 16 and 17 are connected load break switches 18 and 19 respectively, which under normal operating conditions remain open as shown. The load break switches include protective spark gaps and air blast means, the switches and spark gaps being operative to protect the series capacitors from abnormal voltage conditions as described in the above mentioned copending application and U.S. patent. The switches 18 and 19 can further be incorporated in a single mechanical unit as disclosed in the copending application. The switches are shown so arranged in FIG. 1, and can thus be operated as a single unit generally designated by the numeral 20.

To sense an overcurrent flowing in the lines, line 12 for example, and to sense the length of time of the overcurrent, the present invention includes essentially three curren sensing relay devices 22, 23 and 24 connected in series to the line by a current transformer 25.

The relay 22 is preferably an induction type relay device having an inverse time delay characteristic. For purposes of illustration, however, the relay 22 is shown comprising essentially a main coil 22a inductively coupled to a shading or lag coil 22b ordinarily shorted by a set of contacts 22c. Current flow through the main coil of a predetermined minimum value causes the contact 28 to close. The short-circuited coil 22b delays the closing of the contact, giving an inverse time characteristic.

The relay 23 is an instaneous current measuring device having contacts 22c shorting the lag coil 22b, and having a higher current setting. The instantaneous current measuring relay 23 may be a part of the relay unit 22 in which case the two relays would form a single relay unit.

The relay device 24 (only representatively shown in FIG. 1) is a replica relay or temperature simulating device constructed in the manner shown in FIG 3. and to be more particularly described hereinafter.

The heat simulating relay device 24 is connected to a temperature controller device 30 by remote connecting means 31 to be particularly described in connection with the relay 24 as shown in FIG. 3. The temperature controller is mechanically connected to operate a set of contacts 32 in response to changing temperature conditions within the relay device 24 as they are produced by overcurrent conditions on the phase line 12 and induced in the current transformer 25.

The contact sets 28 and 32 are connected in parallel with each other, and serially connected between a lamp 35 and a photo relay receiver unit 36, the photo relay unit comprising essentially a light sensitive element and actuating solenoid (not shown) mechanically connected to operate a set of contacts 37. The lamp and relay may be housed as a single unit 38 as indicated in FIG. 1.

The contacts 37 are connected serially between the solenoid of a trip relay 39 and a rectifier bridge 40 which supplies the lamp 35 and relays 36 and 39 with low voltage, direct current energy from the high voltage phase line 12 through a step-down current transformer 41 and regulator 42.

The solenoid 39 is mechanically connected to latch the bypass switch unit 20 as shown in FIG. 1.

The circuit arrangements so far described is representative of each phase segment, and is generally disposed above the level of the ground on a platform structure (not shown) with the capacitors. This would include the gas reservoir and gas blast control means (for the load break switches 18 and 19) as representatively shown in FIG. 1. In this manner, the high voltages handled by the components on the platform are maintained above ground level and above the location of operating personnel. The low direct current voltage is supplied to those components requiring such a voltage on the platform by the means 40, 41 and 42 as described above. Other means may be employed to provide the low voltage on the platform, for example, a capacitor potential divider device.

To effect simultaneous removal and insertion of series capacitors in two three phase lines so that all phases have the same capacitive reactance at the same time, each phase segment has a photo control section 45 located physically at ground level, as diagrammatically shown in FIG. 1, with all sections interconnected electrically as shown schematically in FIG. 2. Each control section comprises a lamp 47 and a photo relay receiver unit 48 mechanically connected to operate a set of normally open contacts 49. The lamp 47 (at ground level) is optically connected to the photo relay receiver 36 (disposed above ground level) by a light conducting rod 51. Similarly, the photo relay receiver 48 (at ground level) is optically connected to lamp 35 disposed above ground level by a second light conducting rod 52.

In FIG. 1, the light conducting rods are shown curved to conform to the schematic location of the lamps and receiver units. In actual practice, straight light conducting rods may be used to extend between the photo control units 38 and 45 disposed respectively at the top and bottom of an insulating air hose column as described in copending application Ser. No. 670,076, filed by W. H. Cuttino on Sept. 25, 1967 and assigned to the present assignee, now Pat. 3,473,089, issued Oct. 14, 1969.

The photo control section 45, as shown in FIG. 1. is shown electrically interconnected with five more such sections in FIG. 2 in a manner which provides the abovementioned simultaneous interline and interphase switching. The six control sections thus includes six lamps 47 through 47e and six photo relay receiver units 48 through 48e. Each of the relay receiver units comprises essentially a light sensitive element and an actuating solenoid electrically connected together to effect actuation of a set of contacts with the recipt of light energy on the sensitive element. In the present case, and as diagrammatically shown in FIG. 2, the receiver units are connected to effect independent actuation of the contacts 49.

For each lamp 47 in the circuit arrangement of FIG. 2 (at ground level) there is a corresponding photo relay receiver (36 in FIG. 1) disposed adjacent its associated capacitor bank above ground level, and a corresponding light conducting rod (51 in FIG. 1) disposed between the lamp and receiver for optically connecting the lamp and receiver. Similarly, for each photo relay receiver 48 in FIG. 2 (which is at ground level) there is a corresponding lamp (35 in FIG. 1) disposed above ground level and an optically interconnecting light conducting rod (52 in FIG. 1) disposed between the lamp and receiver. Accordingly, in FIG. 2 the rods associated with the lamp 47 through 47e are designated 51 through 51e respectively, and the rods associated with the receiver 48 through 48e are designated 52 through 52e respectively.

The photo relay receivers 48 through 48e are connected in parallel across a source of voltage 55 which commonly supplies the receivers and the lamps 47 through 47e. The lamps are connected in parallel with each other, and in series with the relay contacts 49 and the voltage source 55. Two separate voltage sources may be provided for the receiver units and the lamps.

FIG. 3 shows the essential details of the heat simulating or replica relay device 24, the device being capable of simulating the temperature conditions of the series capacitor units 16 and 17. The device comprises an outer shell or container 60 which is suitably sealed against the entry of outside air and moisture. Within the container 60 is disposed a heater wire 62 having a prescribed resistance and wound on an insulating tube 63 centrally supported within and extending approximately the length or depth of the container.

External connections are provided for the heater wire 62 through insulating bushings 64 surrounding threaded studs 65 disposed on the top wall of the container 60 which, when connected for operation would receive connecting wires from the current transformer 25 and relay 23 as shown in FIG. 1.

Disposed in the approximate center of the container 60 and the insulating tube 63 is a temperature sensing means 67 connected to the temperature controller 30 by the remote connecting means 31 and a connecting extension 68. The sensing and connecting means (67, 68 and 31) and the controller 30 may form a control arrangement of the gas pressure type in which a temperature sensitive gas is held in a closed system comprising a temperature sensing bulb (means 67), a capillary tube (remote connecting means 31 and extension 68) and a gas pressure actuated switch (not shown) located within the controller unit 30. Other sensing arrangements may be employed.

The container 60 is filled with a filler material, for example, silica sand and oil, so that the heater wire 62 and the sensing means 67 are completely embedded in the filler.

The electrical impedances of the heater wire 62 and the current transformer 25 are chosen to match essentially that of a typical series capacitor unit connected in service so that the heat generated in the unit by line current can be simulated in the replica relay 24 for purposes of capacitor protection in a manner presently to be explained. The relay 24 is designed so that the internal temperature will closely reproduce the temperature of the actual capacitor units when the relay is energized and subjected to the same environmental conditions as the capacitor units.

In FIG. 1, the capacitor installation 10 is shown energized and functioning under normal current conditions. The series capacitors 16 and 17 are therefore in the circuit (phase line 12) by virtue of the bypass switches 18 and 19 being open and no arc being established across protective spark gap portions 70 and 71 of the switches.

Figure 4:
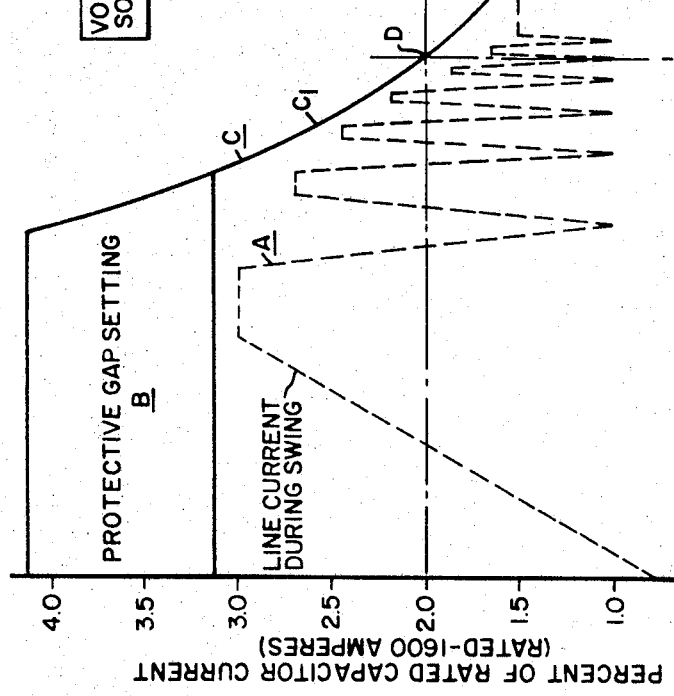
FIG. 4 is a time versus current curve showing a typical load profile with which the means shown in FIGS. 1 through 3 are adapted to function.

When a parallel line in a 500 kv. system for example, is removed from service because of a fault, the current on the faulted line is transferred to its companion line, for example, phase lines 12, 13 and 14. The current on these lines approxiamtely doubles and the system may be expected, in a typical case, to encounter a swing current approaching three times the continuous current rating of the series capacitors 16 and 17 which decreases to one and a half (1½) times the series capacitor current rating within a few seconds. The current then drops to one and a fourth (1¼) times the capacitor rating within about thirty minutes, and within the next thirty minutes it is expected to drop to the continuous current rating of the capacitor. This current or overload profile is illustrated in FIG. 4 for a 500 kv. line though the invention is not limited thereto. The swing current is represented by dashed line which is plotted on a time versus percent of rated capacitor current scale. The series capacitors employed in say a 500 kv. line are normally expected to operate under normal current conditions reaching 75% of their continuous current rating; thus, in FIG. 4, the swing current line A starts at such a point on the ordinate scale.

For overload current values above the maximum swing current value, the spark gaps 70 and 71 of the load-break bypass switches 18 and 19 are adapted to arc over to provide a current path around the series capacitors 16 and 17, and if the overload persists, the bypass switches may be closed by current sensing means, for example, as shown and described in the above-mentioned U.S. Pat. 3,335,362. Graphically, these overload and time parameters are shown in FIG. 4 in an area designated B located above the first and maximum portion of the swing current curve A.

To protect the series capacitors 16 and 17 from short time overloads just below the minimum value at which the protective gaps 70 and 71 sparkover, and from longer, thermally damaging overloads, the present invention is directed as embodied in the figures.

Thus, the circuit shown in FIG. 1 is adapted to close the bypass switch unit 20 when the above-described overcurrent profile occurs on one or more of the phase lines. This profile is graphically shown in FIG. 4 as solid line C which generally has two sloping portion $C_1$ and $C_3$ with an intermediate level portion $C_2$.

When an overcurrent occurs and persists on a phase line, line 12 for example, beyond the current-time parameters described by curve C, at least one of the current sensing relays 22 or 24 will be energized to initiate closing of the bypass switch unit 20; the particular relay energized depends upon the actual overcurrent-time parameters, i.e., the particular location or point along curve C in FIG. 4. For example, if the level of the swing current (dashed line A) does not fall below point D on curve C, which is twice the rated current value for the series capacitors 16 and 17, for say one minute, the instantaneous current sensing relay 23 is energized and thus opens the closed contacts 22c connected across the lay coil 22b of the relay 22, permitting instantaneous operation. If the relay 23 does not operate, the relay 22 operates with a time delay, as previously explained. Thus, the current sensing relay 22 is energized at approximately time T. The relay 22 has a predetermined time versus current operating characteristic defined by the sloping portion $C_1$ of curve C.

If the swing current should rise above a value represented by the straight line portion $C_2$ of curve C after a time period of say one minute (for a second example), the relays 22 and 23 would be energized thereby closing relay contacts 28.

As a third example, should the level of the swing current remain immediately below a value represented by the level portion $C_2$ of curve C for say a time period of one hour, the replica relay and controller (24 and 30) would be energized in a manner presently to be explained. Thus, the second sloping portion $C_3$ of current profile curve C represents the time versus current characteristic of the replica relay 24.

When one of the relay devices 22 or 24 is energized, it functions to close its contacts (28 or 32) which completes the power circuit for energization of the lamp 35. The light energy of the thus energized lamp is directed through the rod 52 down to the relay receiver unit 48 which is thereby actuated to cause the closing of the contacts 49. The closed contacts 49 complete the supply circuit through the lamp 47 which is thereby energized to transmit its light energy up to the relay receiver 36 through the rod 51. The receiver 36 is thereby actuated to close the contacts 37 which causes the closing of the bypass switch unit 20 by completing the power supply circuit through the solenoid 39. The bypass switches 18 and 19 are thus closed to provide a conductive path around the series capacitors 16 and 17 when an overcurrent appears on a phase line having generally the time-current characteristic profile as shown by curve C in FIG. 4.

When the relay receiver 48, at ground level closes the contacts 49, the plurality of lamps 47 through 47e are energized (FIG. 2) so that light signals are simultaneously directed to all above ground segments through respective light conducting rods 51 through 51e. In this manner, a corresponding plurality of relay receivers located above ground level are simultaneously actuated to effect tripping of the bypass switching unit for each phase segment thereby effecting substantially simultaneous switching of a plurality of segments. As schematically shown in FIG. 2, any one of the ground level receivers 48 through 48e can close the lamp energizing contacts 49 by light energy being directed down any one of the corresponding light directing rods 52 through 52e.

Thus, FIG. 2 shows simultaneous switching for six phase segments though more or less may be provided as desired. If the six phase segments are chosen to represent three phase segments for two parallel transmission lines, it is easily seen that the lines can be simultaneously provided with equal capacitive reactance with the circuit arrangement disclosed in FIGS. 1 and 2.

The current sensing relays 22 and 23 protect the series capacitors 16 and 17 from short time overloads immediately below the spark gap setting of the protective gaps 70 and 71 of the bypass switches 16 and 17. In this manner, the series capacitors are protected from swing overcurrents insufficient to cause discharge of the protective gaps, yet which can cause damage to the capacitors if allowed to continue over a period of time.

If a relatively low overcurrent persists for an extended period of time, say two hours, considerable thermal damage to the capacitors could result with no protection being afforded by the protective gaps 70 and 71 and the relay 22 and 23 as long as the magnitude of the overcurrent remained below the discharge setting of the protective gaps and the current levels needed to energize the relays 22 and 23. As explained above the time-current characteristic for a swing current on certain high voltage lines follows generally the profile represented by dashed line A in FIG. 4.

To protect the series capacitors 16 and 17 from such an extended overcurrent, the replica relay or temperature simulating device 24 is employed to effect the tripping of the capacitor bypass switch unit 20. This is accomplished in the following manner:

The heater wire 62 has a prescribed resistance so that it is heated by the overcurrent flowing in say line 12, the wire being connected thereto by the current transformer 25 (FIG. 1) and leads connecting the transformer to the studs 65. The heat energy produced in the wire 62 is conducted through the filler material contained in the container 60 and disposed around the wire and the sensing bulb 67. The heat energy is thus conducted inwardly towards the sensing bulb 67 and outwardly towards the walls of the container 60 which act as heat radiating surfaces.

The electrical resistance of the wire 62, and the dimensions of the container 60 are such that the outside exposed surfaces of the wall structure of the container, radiate the heat energy produced in the wire 62 (and conducted through the filler material) in energy amounts similar to those radiated by typical capacitor units in operation as represented by the capacitors 16 and 17 in FIG. 1.

The internal temperature of the replica relay device is sensed by the bulb 67 and measured by the temperature controller 30. A gas (contained within the closed system comprising the bulb, the pressure switch within the controller 30 and the connecting means 31 and 68) expands and contracts in the bulb with corresponding increases and decreases in temperature within the container 60. The pressure switch within the controller is actuated in response to an expansion of the gas due to an increase in heat within the container to initiate the closing of the replica relay contacts 32 connected in series with the lamp 35 and the rectifier bridge 40. The lamp is thereby energized to initiate closing of the bypass switch units as described above. The pressure point at which the switch in the controller unit is closed can be set by a selector means and scale indicated at 75, all forming part of the controller unit 30. In this manner, the time-current characteristic of the replica relay 24 can be adjusted to suit particular needs and requirements.

Thus, when an overcurrent is present in phase line 12 for a duration of time effective to heat the filler material within the container 60 so that the gas within the bulb 67 is heated and expands through capillary tubes 68 and 31 to actuate the pressure switch within the controller 30, the contacts 32 of the replica relay 24 close to initiate closing the capacitor bypass switches 18 and 19. Such an overcurrent-time characteristic is represented by the sloping portion $C_3$ of curve C in FIG. 4.

After the overcurrent has subsided and operating conditions are again normal, the bypass switch units (20) may be opened by a suitable operating means 72 only representatively shown in FIG. 1. Such means may include a gas or air operated cylinder device manually or automatically actuated, for example, as shown in the above cited U.S. Pat. 3,335,362.

Typical series capacitor units are usually disposed outside in the open air so that their internal temperature condition is affected by the outside (ambient) temperature. Thus, such capacitors have an increased time-current capability at lower ambient temperatures, and a decreased time-current capablity at higher ambient temperature. The present invention takes full advantage of this lower temperature capacitor capability while at the same time provides increased protection for capacitors serving in high temperature environments by disposing the replica relay 24 out-of-doors and in the general area of the capacitor units and banks. In this manner, the series capacitor units and banks. In this manner, the series capacitors are switched out of the circuit (the phase lines) in dependence upon the heat conducting capability of their environment as well as the time-current parameters of the swing current.

It should now be apparent from the foregoing disclosure that a new and useful switching arrangement has been provided in an unobvious manner. By a novel arrangement of current sensing relays and light signaling devices, simultaneous interphase and interline switching is provided to protect electrical components, such as serially connected capacitor units, from overcurrents just below the setting of spark gap devices which currents can nevertheless overload and cause thermal damage to the components if the duration of the overcurrent is extended. Thermal overload protection is provided by the replica relay device 24 designed to simulate the temperature conditions of the components in an ambient environment so that advantage can be taken of lower ambient (heat dissipating) temperatures.

Though the invention has been described in connection with a preferred embodiment, it will be understood that it is not limited to the particular embodiment described, but covers all alternative and equivalent constructions.

What is claimed is:

1. A series capacitor installation for an alternating current line, said installation comprising a capacitor adapted to be connected in series in the line, over-voltage protective means for the capacitor, a bypass switch connected across the capacitor, said bypass switch being normally held in open position, relay means responsive to the current in the line for effecting closing of the bypass switch when the current exceeds a predetermined value, an electrically heated temperature simulating device having thermal and radiating characteristics substantially equivalent to those of the capacitor such that it reproduces the temperature of the capacitor, means responsive to the line current for heating said simulating device, and means for effecting closing of the bypass switch when the temperature of the simulating device exceeds a predetermined value.

2. A series capacitor installation as defined in claim 1 in which the temperature simulating device comprises a container having an external surface for radiating heat, a filler material in the container, a resistor disposed within the container for heating in the filler material, and temperature sensing means for sensing the temperature of the filler material.

3. The combination of claim 2 in which the filler material is a mixture of sand and oil.

4. The combination of claim 2 in which the filler material is a mixture of sand and oil and the resistor and temperature sensing means are embedded in the filler material and spaced from each other.

5. The combination of claim 1 in which the means for effecting closing of the bypass switch includes means for selecting the temperature setting at which the switch is to be closed.

References Cited

UNITED STATES PATENTS

| | | | |
|---|---|---|---|
| 2,536,306 | 1/1951 | Offutt | 317—37 |
| 2,546,008 | 3/1951 | Marbury et al. | 317—12 |
| 2,917,701 | 12/1959 | Salton | 317—40 X |
| 3,385,941 | 5/1968 | Marbury | 317—12 X |

FOREIGN PATENTS

| | | |
|---|---|---|
| 293,542 | 12/1952 | Switzerland. |
| 1,065,530 | 5/1954 | France. |

WILLIAM H. BEHA, JR., Primary Examiner

U.S. Cl. X.R.

317—40, 49